(No Model.)

J. GRIDER.
GRAIN CLEANER ATTACHMENT.

No. 437,891. Patented Oct. 7, 1890.

Witnesses:
Geo. H. Strong

Inventor,
John Grider
By Dewey & Co.
Attys

UNITED STATES PATENT OFFICE.

JOHN GRIDER, OF LA GRANGE, CALIFORNIA.

GRAIN-CLEANER ATTACHMENT.

SPECIFICATION forming part of Letters Patent No. 437,891, dated October 7, 1890.

Application filed April 29, 1890. Serial No. 349,938. (No model.)

*To all whom it may concern:*

Be it known that I, JOHN GRIDER, a citizen of the United States, residing at La Grange, Stanislaus county, State of California, have invented an Improvement in Grain-Cleaner Attachments; and I hereby declare the following to be a full, clear, and exact description of the same.

My invention relates to an attachment for the cleaning or separating mechanism of a thrashing-machine.

It consists of laterally-moving rakes suspended above the cleaning-shoe and the mechanism by which they are operated, so as to throw the chaff and straw toward the center of the shoe and prevent its piling up and accumulating upon the sides.

Figure 1:
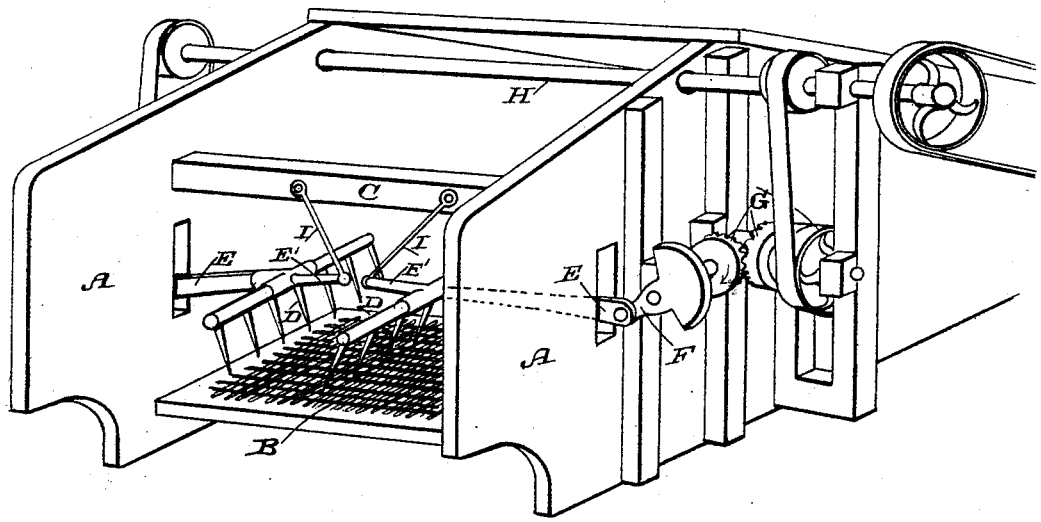
Figure 2:
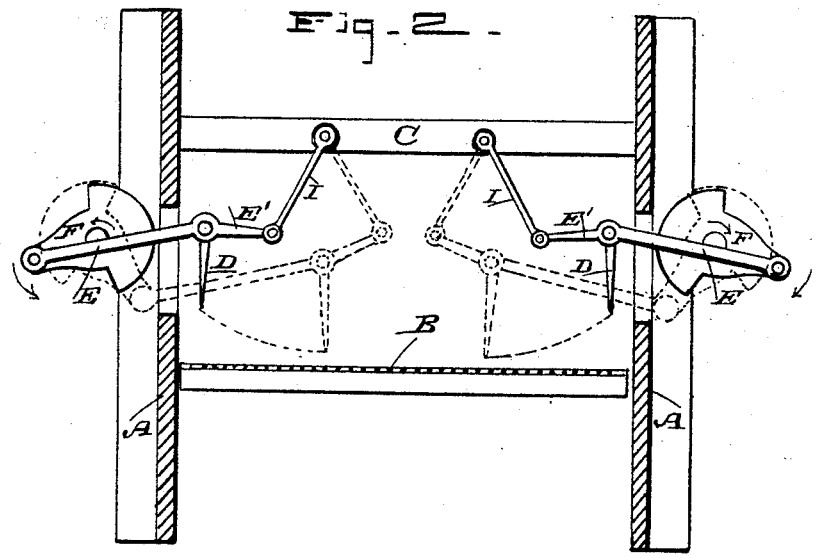

Referring to the accompanying drawings for a more complete explanation of my invention, Figure 1 is a view of the apparatus, showing my invention. Fig. 2 is a transverse vertical section.

This apparatus is adapted for use upon any grain cleaner or separator; but it is especially applicable to traveling harvesters. In the present case I have shown only the rear portion of the casing, illustrating the sieves of the separating shoe and showing the relative position of my invention.

A are the sides of the casing.

B is the upper screen or sieve of the cleaning-shoe, which may have any of the movements which it is customary to give this shoe.

Across the inside of the casing and above the shoe is a bar C, from which the rakes D are suspended. These rakes have teeth projecting downward from heads which extend parallel with the sides of the machine. The handles E of the rakes project through slots in the sides of the machine, and have their outer ends connected with crank-arms F. These crank-arms are fixed upon shafts suitably journaled upon the outer sides of the machine, and by means of beveled gears and belts G motion is communicated to them from a shaft H, which extends across the upper part of the machine, and from which power is usually derived to drive the grain and straw carrying belt, which conveys from the thrashing-cylinder to the separating-shoe. The cranks are preferably provided with counter-weights upon the opposite ends to balance them and prevent undue oscillation by reason of their movement.

The rake-handles E have extensions E' toward the center above the shoe, and these extensions are suspended by links I from the bar C.

When the machine is set in motion, the cranks are rotated in the direction shown by the arrows, and the rake-teeth are carried downward near the sides of the shoe in the first portion of their movement, and as the stroke is completed they are moved toward each other and toward the center of the shoe, when the cranks, passing over the upper arc of their circle, act to raise the rakes and carry them back to the sides above the straw and chaff which is upon the shoe.

The strongest part of the blast from the fan passes through the central portion of the shoe, and the tendency in a stationary machine is to produce eddies, which will carry the chaff and straw toward the sides of the shoe, where it piles up and accumulates to a considerable extent.

In the traveling harvesters the irregularities of the surface of the ground tend to throw the straw and chaff to one side or the other of the shoe, according to the angle of the machine, and this temporarily overloads that side and prevents a perfect cleaning. The operation of my rakes, as will be readily seen, constantly throws the chaff and straw toward the center, where the blast of air will act with its greatest force and throw them upward and backward from the shoe. It prevents accumulations upon the sides of the shoe, and acts, generally, to distribute the grain evenly over its surface, with a tendency toward the center.

Having thus described my invention, what I claim as new, and desire to secure by Letters Patent, is—

1. The combination, with the shoe of the separator, of the transversely-reciprocating rakes moving laterally across its surface from the sides thereof toward the center, substantially as herein described.

2. The cleaning-shoe of a separator, in combination with rakes suspended above the shoe and having a rotary reciprocating motion from the sides toward the center, substantially as herein described.

3. The cleaning-shoe of a separator, in combination with the rakes having handles extending outwardly and connected with rotating cranks, extensions of the handles toward the center, and links whereby the inner ends of these extensions are suspended from points above the shoe, so that the rakes are reciprocated from the sides to the center and partake of the rotary motion of the cranks, substantially as herein described.

4. The cleaning-shoe of the separator, in combination with the rakes having handles the inner ends of which are suspended from points above the shoe, cranks with which the outer ends of the rakes are connected, so that the rakes are given a transverse reciprocating and rotary motion, and a mechanism whereby motion is transmitted to the crank-shafts from the driving-shafts of the machinery, substantially as herein described.

In witness whereof I have hereunto set my hand.

JOHN GRIDER.

Witnesses:
S. H. NOURSE,
H. C. LEE.